(12) United States Patent
Putnam

(10) Patent No.: US 6,568,049 B1
(45) Date of Patent: May 27, 2003

(54) HYDRAULIC SEAMING TOGETHER OF LAYERS OF NONWOVEN FABRIC

(75) Inventor: Michael Putnam, Fuquay Varina, NC (US)

(73) Assignee: Polymer Group, Inc., North Charleston, SC (US)

( * ) Notice: Subject to any disclaimer, the term of this patent is extended or adjusted under 35 U.S.C. 154(b) by 97 days.

(21) Appl. No.: 09/594,848

(22) Filed: Jun. 15, 2000

(51) Int. Cl.⁷ ................................................ D04H 1/46
(52) U.S. Cl. ............................................ 28/104; 28/105
(58) Field of Search .................... 28/104, 105, 106, 28/103, 142, 158, 167; 8/148, 149; 156/62.8, 148, 182, 184, 290, 291, 324; 264/557, 563, 570, 119

(56) References Cited

U.S. PATENT DOCUMENTS

| | | | | | |
|---|---|---|---|---|---|
| 3,800,364 A | * | 4/1974 | Kalwaites | .................... | 28/105 |
| 4,070,217 A | * | 1/1978 | Smith et al. | ................. | 156/148 |
| 4,514,455 A | * | 4/1985 | Hwang | ........................ | 428/102 |
| 4,691,417 A | * | 9/1987 | Vuillaume | .................... | 28/105 |
| 4,695,500 A | * | 9/1987 | Dyer et al. | .................... | 28/104 |
| 4,805,275 A | * | 2/1989 | Suzuki et al. | ................. | 28/104 |
| 4,984,340 A | * | 1/1991 | Nagatsuka et al. | ........... | 28/104 |
| 5,238,644 A | * | 8/1993 | Boulanger et al. | .......... | 264/119 |
| 5,288,536 A | * | 2/1994 | Zafiroglu | ..................... | 28/104 |
| 5,301,400 A | * | 4/1994 | Boulanger | .................... | 28/104 |
| 5,768,756 A | * | 6/1998 | Noelle | ........................... | 28/104 |
| 6,314,627 B1 | * | 11/2001 | Ngai | ............................ | 28/104 |

* cited by examiner

Primary Examiner—Amy B. Vanatta
(74) Attorney, Agent, or Firm—Wood, Phillips, Katz, Clark & Mortimer

(57) ABSTRACT

The method for hydraulic seaming together of two layers of consolidated nonwoven fabric in one or two directions simultaneously provides soft, supple seam lines, along which formed seam lines, cuts can be made for producing bag like articles from the seamed layers, such as, for example, pillow cases, or industrial filters.

17 Claims, 2 Drawing Sheets

HYDRAULIC SEAMING TOGETHER OF LAYERS OF NONWOVEN FABRIC

BACKGROUND OF THE INVENTION

1. Field of the Invention

The present invention relates to a process of hydraulic seaming together of layers of nonwoven fabrics in one or two directions at a time.

2. Prior Art

Spunlacing or hydroentanglement using water jets has been used to combine layers of filament or fiber webs in continuous processes for many years. Layers of webs are manufactured using most standard spunlace equipment disclosed in prior process patents describing entangling systems, such as in Evans U.S. Pat. No. 3,485,706, incorporated begin by reference.

Hydroentangled nonwovens produced in roll form are used in the further manufacture of many products ranging from complex articles such as clothing to less complex items such as filters, filtration bags, pillow ticking, upholstery backing, etc. Bonding in selected areas is generally involved in the production of products. Seam formations used to join layers together are normally made by sewing, by use of adhesives, by thermal bonding, or by ultrasonic sewing.

Sewing produces a strong joint but is typically a slow process and leaves behind minute separations at the thread joints. Thermal bonding is suited to high speeds and automated systems but nonwovens made of certain non-thermoplastic materials, such as cotton or rayon cannot be thermally bonded due to their intrinsic characteristics. Thermal seaming of thermoplastic fabrics typically results in a stiff seam, since the seam line is like a weld. Adhesive bonding adds to the cost of the fabric due to the raw materials and additional processing equipment and processes. Further, adhesive seams can also be stiff, depending upon the type of adhesive utilized. Ultrasonic bonding or sewing has speed limitations and its efficiency is greatly influenced by the basis weight of the fabrics. Also, ultrasonic sewing is subject to the same fabric thermal property limitations as thermal bonding.

There is limited discussion in the art on using water jets to join fibrous webs together in a selected pattern. U.S. Pat. No. 4,970,104 describes using a hydroentangling process to pattern bond previously unbonded fibrous batts, as an alternative to thermal pattern bonding. U.S. Pat. No. 3,514,455 refers to the manufacture of a quilted batting where a thermally bonded polyester continuous filament fabric is joined to a staple fiber batt by means of an all over pattern of spot bonding by water jets. The quilting is achieved by forming closely spaced parallel rows of hydraulically formed "stitches" along the length of the stacked layers in the direction of travel of the fabric along a belt of a machine used to create the parallel rows of stitches.

The production of load bearing seams, such as for garment or upholstery manufacture, requires a significantly stronger seam than required for spot bonding or quilting. Preparation of quilt padding is intended primarily to hold layers in proximity and prevent interlayer slippage and bunching. Seams in apparel and upholstery are required to withstand significant stresses, applied in multiple directions, without failure.

To date there has not been proposed a process for seaming together in the direction of travel and/or in the cross direction two layers of nonwoven fabric, with the seams being suitable for use in an environment requiring softness and suppleness of the seam, in combination with a suitable degree of strength of the bond, such as when an end seam is formed in, for example, a pillow case.

SUMMARY OF THE INVENTION

According to the invention there is provided a process for seaming together at least two layers of nonwoven fabric, with the individual layers being prebonded. Manufacture of the seams is contemplated for both the direction of travel of the webs in the seaming process and/or in the cross direction, as the webs are passed through a hydroentangling station. It is an aspect of the invention that the seams produced are sufficiently strong as to withstand the stresses and tensions normal to construction seams in anticipated end use applications. It is a further aspect of the invention that the seams thus provided would be soft and supple and free of any holes, needle marks, fused areas or chemicals. It is a still further aspect of this invention that the seam width and design would be infinitely variable and that the seams would be produced continuously. It is yet another aspect of this invention that adjacent product pieces defined by the seam perimeters could be separated from each other in a continuous or batch cutting or slitting process where the seam lines provide the cut lines for such processing.

In another aspect of the invention, a nonwoven fabric assembly is provided, in which the assembly comprises at least a pair of superimposed layers of consolidated nonwoven fabrics. The assembly comprises at least one line of seam between the layers, with the seam being characterized by a concentrated and continuous line or sector of entanglement of the fibers between the fabrics, providing a durable and high strength seam, which can exceed the tensile strength of the fabric. The seam is additionally characterized as being highly flexible and devoid of any other extraneous bonding aids, such as thread, adhesives, and relatively stiff thermal bonds. Typically, seams of the present invention would preferably occupy less than about 10% and most preferably 5% of the surface area of at least one of the joined fabric layers. The remainder of the surface area of the joined layers would generally be free of seams or constructive stitches according to the methods described for the invention.

DESCRIPTION OF THE PREFERRED EMBODIMENTS

Figure 1:
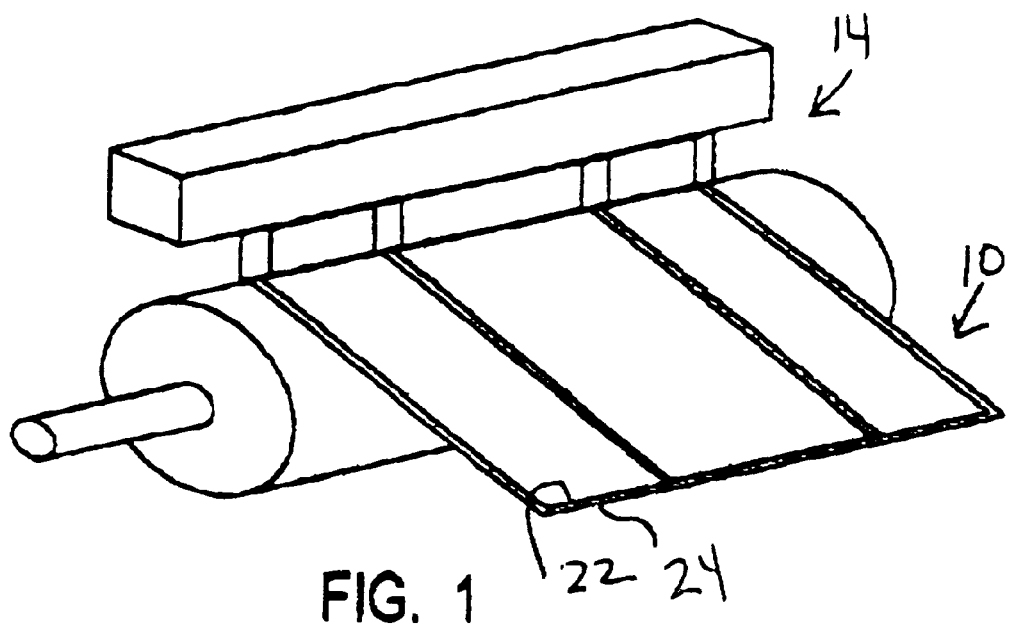
FIG. 1 is a first general layout for the continuous assembly of nonwoven fabric layers which are seamed together using high pressure water jets of a hydroentangling machine, the seam lines here being shown formed in the direction of travel through the machine.

Referring now to the drawings in greater detail, there is illustrated therein the methodology or process of the present invention for continuous seaming together of nonwoven fabric layers using high-pressure water jets of a hydroentangling station.

The process starts with at least two separate webs of consolidated nonwoven fabrics, which can be supplied, for example, from separate rolls. The term "consolidated" as used herein refers to a web comprising fibers and/or filaments of natural and/or synthetic composition, wherein the web has been rendered coherent and dimensionally stable by a process other than weaving. The term "fibers" as used herein shall be deemed to include individual fibers as well as continuous filaments.

The preferred method of consolidation is by hydroentanglement, in which a web loose fibers is deposited upon a porous support, and the web is passed beneath one and preferably a series of manifold having a large number of small openings supplied with water under high pressure, creating fine high velocity jets which impinge the web and entangle the fibers. The details of this process are described in the above noted Evans U.S. Pat. No. 3,485,706 incorporated herein by reference. While hydroentangled or so-called spunlace fabrics are preferred, other fabrics, for example, include webs which have been thermally bonded, chemically or adhesively bonded, or mechanically bonded.

The seamed fabric can be precision slit along the seam lines to produce long segmented tubular assemblies that can by further cut to produce useful items, such as pillow cases. In the specific example illustrated in FIG. 1, the formed straight tubular sections could be slit apart along the seam lines to create bag filters for industrial filter houses.

Further, surface patterned or printed fabrics could be seamed together with the patterned or printed sides facing one another with the finished piece being turned inside out, hiding the cut finished edge of the seam as is standard for many apparel and furnishing applications.

Figure 3:
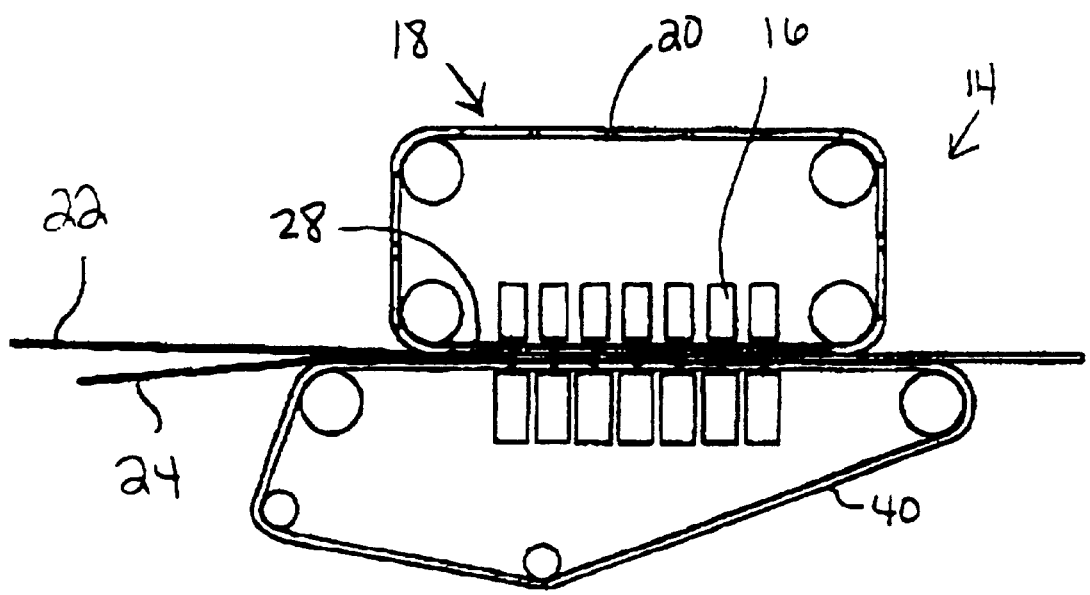
FIG. 3 is a side view through a hydroentangling station showing a belt of templates used to produce a desired seam lane pattern.

A side view of a water jet station 14 used in the seaming process is presented in FIG. 3. The plurality of water jets 16 in the station 14 can be specifically positioned to produce seaming in a pre-determined pattern, either simple linear 10 or two-directional 12 (along the line of motion through the station 14 and/or thereacross, as illustrated).

In this embodiment of the seaming process, barrier templates 18 are created which have a predefined pattern of openings 20 therethrough, the openings 20 defining the desired seam lines to be created in the underlying stacked webs 20,24 being processed through the hydroentangling station 14. The templates 18 are joined together to create a belt 26, one run 28 of which is positioned under jets 16 normally used for hydroentangling an entire web so that portions of the stacked webs 22,24 passing beneath the templates 18 are protected from the seaming jets 16. Thus, only sections of the stacked webs which do not underlie the templates 18 (or underlie the openings 20 therein) are accessible by the jets 16 to create entangled seam lines therealong. In this manner, a hydroentangling station 14 can simply be converted into a water jet seaming station 14.

Figure 4:
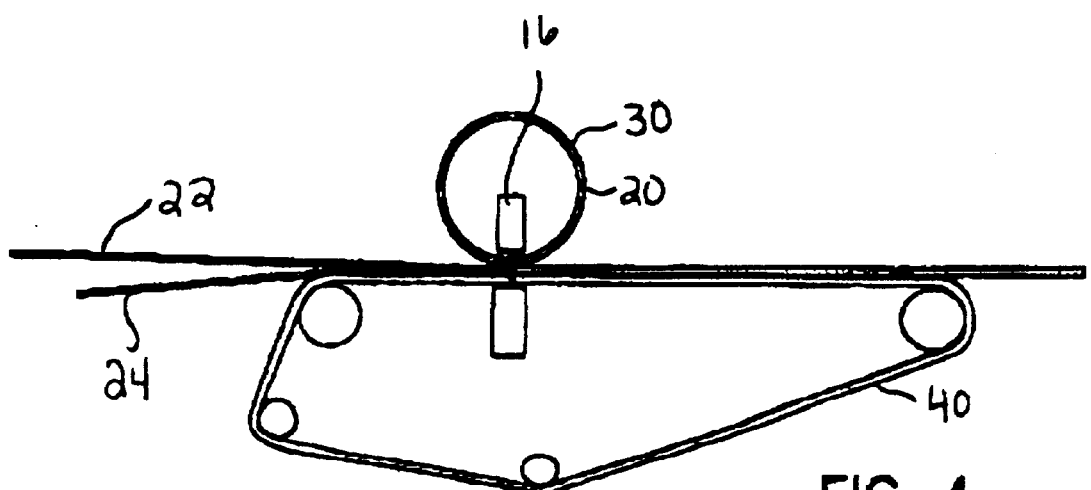
FIG. 4 is a side view through a hydroentangling station showing a pattern drum used to define seam lines.

FIG. 4 shows an example of an alternative porous drum 30 which may be used to define the seams lines.

In one prototype tested, two webs 22,24 were seamed together using a set of water jets 16 with 200 micrometer (0.0787") orifices at a density of 33.33 jets 16 per inch, arranged in a predetermined seaming pattern. The jets 16 were operated at 4000 psi to achieve a level of entanglement which has strength characteristics necessary for seaming.

In another prototype tested, a rectangular template 18 was used under a 12 jet, full width entangler 14, using jets 16 with 0.005" orifices at a density of 50 jets 16 per inch, the jets 16 operating under the following pressure sequence—100, 100, 100, 400, 400, 400, 1600, 1600, 1600, 1600 (psi).

The base fabrics used in these trials were 1.2 osy consolidated spunlace of 75% rayon and 25% polyester, or 2 osy spunlace of 88% rayon and 12% polyester, the fibers used in creating the spunlace being of 1.5 denier and being approximately 1.5 inches in length.

The invention anticipates the use of any nonwoven base fabric, staple fiber or continuous filament, preferably bonded using any known methods including chemical, thermal, through-air and hydroentangling.

Delving into greater detail, the most preferred fabric embodiment for use in the process, as stated above, is hydroentangled staple fiber fabric or hydroentangled continuous filament fabric. The basis weight range of the substrate fabrics is 0.25–4 osy with 0.5–3.0 osy being most preferred. The denier of the staple fibers or continuous filaments in the fabrics are preferably of 1–3.5 denier. Selection of fabrics to be seamed is necessarily based on end product requirements and the process is not limited to seaming together of like fabrics only, although extremely well suited to such use.

For high pressure jets 16 specifically selected and predeterminedly arranged in patterns for predefined patterns of seaming of fabric layers 22,24 together, the orifices are most suitably in the range of 0.01–0.10", at a density of 20–50 jets 16 per inch. Jet 16 pressures above 1000 are recommended with pressures greater than 3000 being most preferred, dependent upon the type and weight of fabric substrates to be seamed together. For the embodiment utilizing the template 18 to block jets 16 in the normally full width entangler 14, adjusting the final jets 16 to greater than 1000 psi is preferred, with greater than 1500 psi being most preferred.

Using the process (method) described, layers 22,24 of web are selectively bonded along specific lines or sectors to produce a seamed nonwoven structure that can in turn be used to produce finished nonwoven products. After seaming, specialty chemicals, such as fire retardants, pigmented latexes, etc., could be applied, as required. The seamed webs would then be dried. After drying, precision slitting and cutting along the seam lines created would be accomplished to produce a finished products, such as pillow cases.

Figure 2:
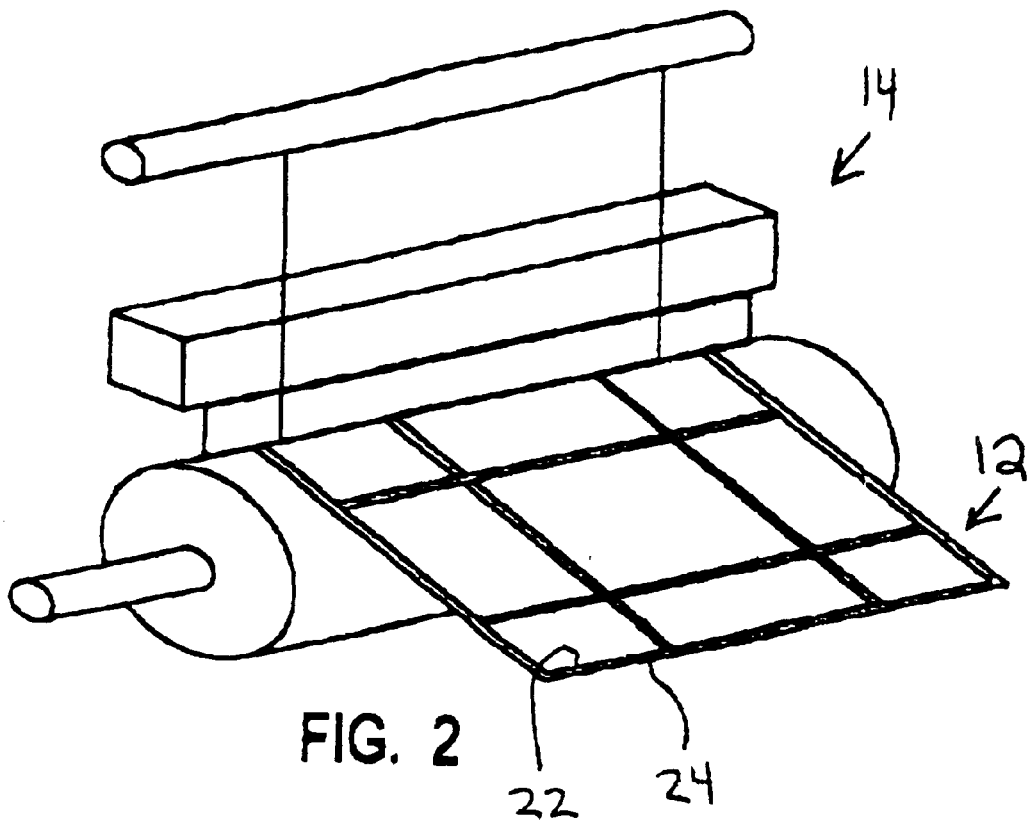
FIG. 2 is a second general layout for the continuous assembly of nonwoven fabric layers using high pressure water jets of a hydroentangling machine, the seam lines here are being shown formed not only in the direction of travel through the machine but in the cross direction as well.

Using high pressure jets 16 positioned at predetermined distances from one another produces seamed webs such as shown in FIG. 2. When webs of this example are precision slit in the seam line, a tubular nonwoven assembly is produced which has two elongate edges and one end seamed together. This tubular assembly has many useful applications. Manufacture of pillow cases, as one example, is simplified. The pillow case can be made by cutting along the seam lines and only requires sewing of a single end seam.

The machinery used to produce the examples described above was a standard hydroentangling system 14 capable of emitting water from the jets 16 at high pressure. Two entangled and imaged webs 22,24 were unwound into the spunlacing (hydroentangling) machine 14 in a continuous manner at 40 feet per minute, with imaged surfaces (if desired) facing each other (on the inside upon seaming together).

Once the layers 22,24 are seamed together and cut apart along the seam lines, the article is turned inside out to expose the imaged surfaces. In one example, continuous filament polyester webs weighing 4.6 oz/sq. yd. were entangled and patterned to a corduroy appearance using a specially designed image transfer device such as a porous roll having a three dimensional surface. Two rolls of such continuous filament web were unwound into a single station entangler 14 with the webs 22,24 stacked upon one another for seaming in selected areas or lines only.

The two webs 22,24 were unwound in a stacked configuration and seamed together using high pressure water jets 16 running at 4000 psi. The particular jets 16 used in the application were drilled with 200 micron orifices spaced 33.33 jets 16 per inch in areas where the creation of seam lines was desired. Selected areas under the row of jet 16 orifices were "blanked" using the templates 18 described above to provide areas in the layers that were unseamed, in a manner similar to that described in connection with FIG. 2.

It will be understood that the strength of a seam must be significantly greater than the strength required for stitching which does not act as a seam. For example, stitches required to produce a quilting effect are usually less dense inasmuch as the quilting is typically used to assure that layers cannot shift relative to one another, rather than joining two layers together in an area where increased duress is applied, such as upon stuffing of a pillow. Thus, a bond strength greater than that necessary for quilting must be achieved by the seaming process.

Figure 5:
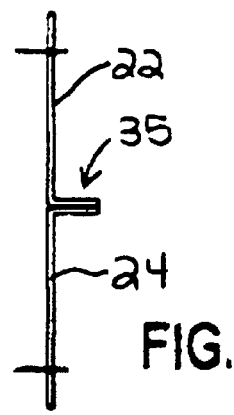
FIG. 5 is a cross sectional view showing how the seam strength was tested using the Instron device.

The bond strength in the areas seamed together by the method disclosed was measured by an Instron device, as illustrated in FIG. 5. The strength of a 1 inch by 1 inch seamed area 35 averaged 5.77 lbs. The strip tensile strength (cross-direction tensile strength) of the nonwoven filament webs that were layered was an average 12.42 lbs. Use of a single orifice jet 16 strip at 4000 psi produced the 5.77 lbs. bond strength. Use of multiple jet 16 strips and/or higher pressures could easily be incorporated to increase the bond strength.

In the test shown in FIG. 5, the strength of a strip of seamed material having layers 22 and 24 and a central seam 35 is employed. The ends of the layers 22 and 25 are moved apart at a constant rate, while the load in pounds or gram is recorded. The seam strength is determined by recording the maximum load before the seam fails. The tensile strength of the individual layers can be evaluated using the same method. Since the seam is formed solely by fiber entanglement, seam strength is directly related to the degree of entanglement, and hence, the energy employed in the hydraulic seaming process.

An added advantage is provided in that formation of seam lines with the high pressure water jets 16 provides layer to layer bonding along lines or sectors without the minute unbonded separations that occur in sewn seams between the threaded joints.

In general terms, the strength of the seam will be determined by a number of factors, including hydraulic surface applied to the seam line, the forming surface on which the seam is formed, the width of the seam, and to some extent, the basis weight and nature of the fabric being seamed. Adequate seam strength can be defined as the tensile strength of the seam relative to the cross-directional tensile strength of the fabric, if the seams run in the machine direction of the fabric. Depending on end use requirements, the seam has a tensile strength which is greater than 30% of the cross-directional strength of a single layer of the fabric and more preferably greater than 50% of said tensile strength.

A number of sample products were produced using templates 18 to protect sections of the underlying webs 22,24 from the effects of the high pressure water jets 16. During the sampling, the webs 22,24 were fed into the hydroentangling system 14 and a simple template 18, rectangular in shape was fed into the hydroentangling system 14. The hydroentangling station 14 was set up with the following jet 16 pressure sequence—100, 100, 100, 400, 400, 1600, 1600, 1600, 1600, 1600 psi. The forming wire 40 was run at 25 feet per minute. The jets 16 used for all treatments had 0.005" drilled orifices, spaced 50 per inch.

The product was bonded at the edges of the template 18. Each laminate layer 22,24 was a pre-entangled and patterned 1.2 oz/sq. yd 75% rayon and 25% polyester spunlace product. Both the rayon and polyester fibers were 1.5 denier and approximately 1.5 inches long. The bond strength of the hydraulically seamed edge areas of the laminate was found to be stronger than the cumulative bond strength of the nonwovens when added together and the product could easily be converted into a bag or similar article.

Also, while parallel seaming is considered most efficient, it will be understood that provision of the templates (flat or drum form) would allow any seaming pattern to be created.

As described above the seaming process of the present invention provides a number of advantages, some of which have been described above and others of which are inherent in the invention. Also, modifications may be proposed to the process, without departing from the teachings herein. Accordingly, the scope of the invention is only to be limited as necessitated by the accompanying claims.

What is claimed is:

1. A method for seaming together previously bonded nonwoven fabrics in a predetermined pattern using a hydroentangling station incorporating a plurality of high pressure water jets, comprising the steps of:

feeding a plurality of stacked layers of previously consolidated nonwoven fabrics to the hydroentangling station; and allowing only a preselected plurality of hydroentangling jets of the station to entangle the layers together to provide a seam.

2. The method of claim 1 producing an article made of nonwoven fabrics, the fabrics being joined together by seams created using the hydroentangling station.

3. The method of claim 1 wherein the fabrics comprise thermoplastic fibers.

4. The method of claim 1 wherein the fabrics include cellulose based fibers.

5. The method of claim 1 wherein the plurality of stacked layers are of similar fabrics.

6. The method of claim 1 wherein the plurality of stacked layers are of dissimilar fabrics.

7. The method of claim 1 wherein the nonwoven fabrics comprise consolidated continuous filament fabrics.

8. The method of claim 1 wherein the nonwoven fabrics comprise consolidated carded fiber fabrics.

9. The method of claim 1 wherein said fabrics have a machine direction and a cross machine direction, said seam extends generally in said machine direction, and wherein said seam has a tensile strength of at least 30% of the cross machine tensile strength of one of said fabric layers.

10. The method of claim 9 wherein said seam has a tensile strength of at least 50% of the cross machine tensile strength of one of the fabric layers.

11. The method of claim 1 wherein the predetermined pattern is linear.

12. The method of claim 1 wherein the predetermined pattern is two directional.

13. The method of claim 1 wherein the predetermined pattern is produced through use of a template interposed between the jets of the hydroentangling station and the stacked layers of nonwoven fabrics, the template blocking predefined areas of the stacked layers of nonwoven fabrics from predetermined ones of the jets.

14. The method of claim 1 wherein the seams are continuously formed.

15. The method of claim 1 further including the step of separating articles created by the seaming from one another by cutting along the seam lines within the bonded portion of the seams.

16. A method for seaming together previously consolidated nonwoven fabrics in a predetermined pattern using a hydroentangling station including a plurality of high pressure water jets, comprising the steps of: feeding a plurality of stacked layers of fabrics to the hydroentangling station; and allowing only a preselected plurality of hydroentangling jets of the station to entangle the layers together to form at least one seam.

17. An article made by the method of claim 16.

* * * * *